Figure 1:
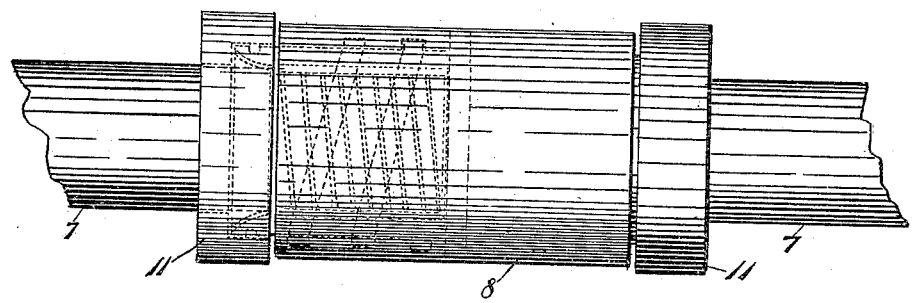
Figure 4:
Figure 3:
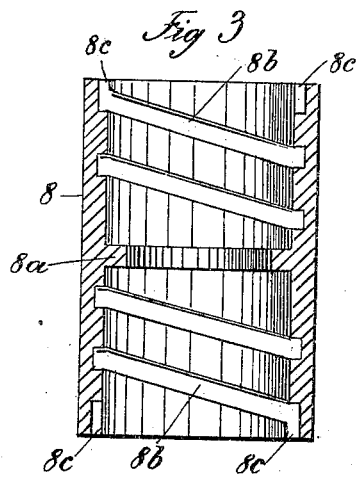
Figure 5:
Figure 6:
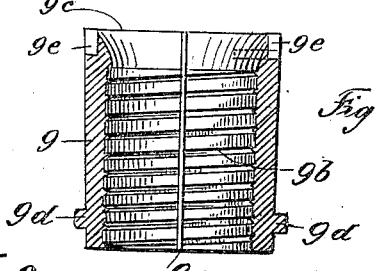

No. 684,631. Patented Oct. 15, 1901.
H. R. DEAN.
PIPE COUPLING.
(Application filed Apr. 30, 1901.)
(No Model.)

WITNESSES
INVENTOR
Henry R. Dean
BY
Edgar Tate
ATTORNEYS

UNITED STATES PATENT OFFICE.

HENRY R. DEAN, OF BROOKLYN, NEW YORK, ASSIGNOR OF ONE-HALF TO JAMES A. PRICE, OF SAME PLACE.

PIPE-COUPLING.

SPECIFICATION forming part of Letters Patent No. 684,631, dated October 15, 1901.

Application filed April 30, 1901. Serial No. 58,130. (No model.)

*To all whom it may concern:*

Be it known that I, HENRY R. DEAN, a citizen of the United States, residing at Brooklyn, in the county of Kings and State of New York, have invented certain new and useful Improvements in Pipe-Couplings, of which the following is a full and complete specification, such as will enable those skilled in the art to which it appertains to make and use the same.

The object of this invention is to provide an improved pipe-coupling, particularly designed for use in connecting pipes for use as electric conduits, which may be employed wherever couplings of this class are desired.

The invention is fully disclosed in the following specification, of which the accompanying drawings form a part, in which the separate parts of my improvement are designated by the same reference characters in each of the views, and in which—

Figure 2:
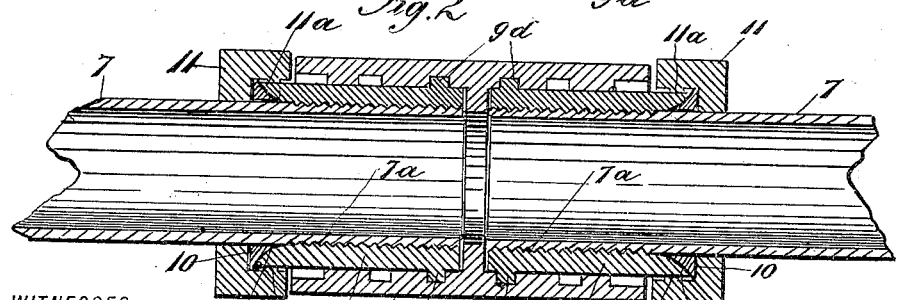

Figure 1 is a side view of my improved pipe-coupling; Fig. 2, a longitudinal section thereof, and Figs. 3, 4, 5, and 6 similar sections of details of the coupling.

In the drawings forming part of this specification I have shown at 7 the ends of two pipes which are connected by my improved coupling, and in the practice of my invention I provide a main outer coupling-sleeve 8, two similar supplemental coupling-sleeves 9, two similar packing-rings 10, and two similar collars 11. The supplemental sleeves 9 are slightly larger at one end than at the other and are split longitudinally at one side, as shown at $9^a$ in Fig. 6, and each of these sleeves is provided with internal ribs $9^b$, formed by corresponding grooves, which in the drawings are shown in the form of screw-threads, but which may consist simply of annular beads, if desired, and the pipes 7 are also provided with similar annular beads $7^a$ and corresponding annular grooves and which are also shown as threads, but which may consist simply of annular beads. The outer ends of the supplemental sleeves 9 are also beveled internally, as shown at $9^c$, so as to receive the packing-rings 10, and said supplemental sleeves are provided at their inner ends and at the opposite sides thereof with outwardly-directed lugs $9^d$, and at the outer ends of said supplemental sleeves are angular or bayonet slots or grooves $9^e$, adapted to receive inwardly-directed lugs $11^a$, with which the collars 11 are provided.

The main outer coupling-sleeve 8 is provided centrally and internally with an annular bead or flange $8^a$, and each end portion thereof is provided with a deep spiral groove $8^b$, and these grooves open at each end, as shown at $8^c$, and extend in opposite directions and are adapted to receive the lugs $9^d$ on the supplemental sleeves 9.

The supplemental sleeves 9 possess slight elasticity and are adapted to be slipped onto the ends of the pipes 7 and to be clamped thereonto, so as to prevent them from slipping on said pipes, and in the operation of coupling the pipes one of the packing-rings 10 is placed in one of the collars 11, and said ring and collar are connected with one of the supplemental sleeves 9. The said supplemental sleeve is then slipped onto one of the pipes and the main outer coupling-sleeve is screwed thereonto, and in this operation the said supplemental sleeve is securely clamped onto the pipe and is drawn up against the annular bead or flange $8^a$ in the main outer sleeve. The other supplemental sleeve, collar, and packing-ring are then connected in the same manner and slipped onto the other pipe, and said sleeve is then screwed into the other end of the main outer coupling-sleeve 8. This operation securely connects the parts, as shown in Fig. 2, and a perfectly tight and secure coupling is formed.

Having fully described my invention, what I claim as new, and desire to secure by Letters Patent, is—

1. A coupling for pipes, comprising two similar supplemental sleeves which are split at one side longitudinally and provided with internal ribs or beads, said supplemental sleeves being beveled internally at their opposite ends, packing-rings adapted to be inserted into the beveled ends of said supplemental sleeves, collars adapted to be connected with the ends of said sleeves, and a main outer coupling-sleeve, substantially as shown and described.

2. A coupling for lead pipes, comprising two similar supplemental sleeves 9, each of which is split at one side, and the opposite ends of which are beveled internally, packing-rings adapted to enter the beveled ends of said sleeve, collars adapted to be connected with the ends of said sleeves, and a main outer coupling-sleeve 8 adapted to be screwed onto one of said sleeves, and into which the other sleeve is adapted to be screwed, substantially as shown and described.

3. A coupling for lead pipes, comprising two similar supplemental sleeves 9, each of which is split at one side, and the opposite ends of which are beveled internally, packing-rings adapted to enter the beveled ends of said sleeve, collars adapted to be connected with the ends of said sleeves, and a main outer coupling-sleeve 8 adapted to be screwed onto one of said sleeves, and into which the other sleeve is adapted to be screwed, said supplemental sleeves being larger at one end than at the other, substantially as shown and described.

In testimony that I claim the foregoing as my invention I have signed my name, in presence of the subscribing witnesses, this 27th day of April, 1901.

HENRY R. DEAN.

Witnesses:
T. A. STEWART,
F. F. TELLER.